United States Patent
Patvarczki et al.

(10) Patent No.: US 9,154,566 B2
(45) Date of Patent: *Oct. 6, 2015

(54) METHOD AND SYSTEM FOR PROVIDING PRESENCE INFORMATION

(71) Applicant: WallRust, Inc., Sunnyvale, CA (US)

(72) Inventors: Jozsef Patvarczki, Sunnyvale, CA (US); Adam Kornafeld, Worcester, MA (US); Endre Tomas, Worcester, MA (US)

(73) Assignee: Wallrust, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/569,827

(22) Filed: Dec. 15, 2014

(65) Prior Publication Data

US 2015/0120850 A1    Apr. 30, 2015

Related U.S. Application Data

(63) Continuation of application No. 13/626,817, filed on Sep. 25, 2012, now Pat. No. 8,914,000, which is a continuation-in-part of application No. 12/896,820, filed on Oct. 1, 2010, now Pat. No. 8,275,365.

(51) Int. Cl.
*H04L 29/06* (2006.01)
*H04L 29/08* (2006.01)
(Continued)

(52) U.S. Cl.
CPC ............. *H04L 67/24* (2013.01); *H04L 51/043* (2013.01); *H04L 51/32* (2013.01); *H04L 67/306* (2013.01); *H04W 4/00* (2013.01); *H04W 4/02* (2013.01); *H04L 29/08108* (2013.01)

(58) Field of Classification Search
CPC .... H04W 4/02; H04W 4/00; H04L 29/08108; H04L 67/24; H04L 67/306; H04L 51/32; H04L 51/043

USPC ......... 455/414.3, 550.1, 466, 412.1; 709/203, 709/227

See application file for complete search history.

(56) References Cited

U.S. PATENT DOCUMENTS 6,205,478 B1    3/2001  Sugano et al.
7,219,303 B2 *  5/2007  Fish ............................. 715/753
(Continued)

FOREIGN PATENT DOCUMENTS

WO    2009/114842 A2    9/2009

OTHER PUBLICATIONS

Skype presence notification options page, Skype version 4.2.0.187, released Sep. 7, 2010.
(Continued)

*Primary Examiner* — Mahendra Patel
(74) *Attorney, Agent, or Firm* — Altman & Martin; Steven K Martin

(57) ABSTRACT

A system and method for a user to send presence information to authorized contacts in her device's address book and to receive the presence information of those contacts in her device's address book that have authorized her. A user can authorize any contact in her address book. Optionally, a user can only authorize a contact and be authorized by a contact if she is in that contact's address book. A local application on the device interacts with and displays the device's address book, manages the authorization of contacts, updates the user's presence, and receives and displays the presence of contacts. The local application updates the user's presence manually, semi-automatically, or automatically. Semi-automatic updates involve synchronizing with the device's calendar. Automatic updates may involve the use of location data, the device's built-in sensors, and augmented reality.

7 Claims, 3 Drawing Sheets

(51) Int. Cl.
*H04W 4/00* (2009.01)
*H04W 4/02* (2009.01)
*H04L 12/58* (2006.01)

(56) References Cited

U.S. PATENT DOCUMENTS

| | | | |
|---|---|---|---|
| 8,150,430 B2* | 4/2012 | Sennett et al. | 455/466 |
| 8,195,137 B2* | 6/2012 | Ziklik | 455/415 |
| 8,275,365 B1 | 9/2012 | Patvarczki et al. | |
| 8,285,317 B2* | 10/2012 | Wenger | 455/519 |
| 8,600,360 B1 | 12/2013 | Patvarczki et al. | |
| 8,914,000 B2 | 12/2014 | Patvarczki et al. | |
| 2004/0127253 A1 | 7/2004 | Hauptvogel et al. | |
| 2004/0141594 A1* | 7/2004 | Brunson et al. | 379/88.12 |
| 2005/0044152 A1 | 2/2005 | Hardy et al. | |
| 2005/0080846 A1* | 4/2005 | McCleskey et al. | 709/202 |
| 2006/0031368 A1 | 2/2006 | deCone | |
| 2006/0058025 A1* | 3/2006 | Barrow | 455/433 |
| 2007/0032194 A1* | 2/2007 | Griffin | 455/41.2 |
| 2007/0124721 A1* | 5/2007 | Cowing et al. | 717/100 |
| 2009/0147772 A1* | 6/2009 | Rao et al. | 370/352 |
| 2009/0215486 A1* | 8/2009 | Batni et al. | 455/550.1 |
| 2010/0211634 A1* | 8/2010 | Song et al. | 709/203 |

OTHER PUBLICATIONS

Office Action dated Feb. 29, 2012 from U.S. Appl. No. 12/896,820.
Office Action dated Feb. 19, 2013 from U.S. Appl. No. 12/945,849.

* cited by examiner

METHOD AND SYSTEM FOR PROVIDING PRESENCE INFORMATION

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to telecommunications systems and social networks, more particularly, to networks of device users sharing common contacts and how they are connected together to create a social network.

2. Description of the Related Art

In computer and telecommunications networks, presence information is a status indicator that conveys the ability and willingness of a potential communication partner to communicate.

A basic feature of a telephone (including cell phones, desktop phones, wireless phones, etc.) or any other device that can communicate with others (such as desktop computer, laptops, netbooks, and tablets using e-mail, Voice-Over-Internet (VoIP), etc.) is the address book. An address book is a database used for storing entries called contacts. Each contact entry usually consists of a few standard fields (for example: first name, last name, company name, address, telephone number, e-mail address, domain name, fax number, and mobile phone number). In this document, the term, address book, refers to this database and the term, device, refers to any device equipped with an address book having the ability to access the Internet.

The act of someone storing a contact in the address book of her device is an implicit indication that she knows the entity (a person or a company) that the contact is describing. It is also an implicit indication that the users of two devices know each other if the address book of each device contains the contact information of the other person.

A number of systems exist that include a means by which users can voluntarily announce their presence on the system. Relevant presence information, which is also referred to herein as "presence", is made available to those on the system that wish to receive the information.

A social network, as used in the present specification, is a data structure that ties individuals and organizations together. One or more specific types of interdependency connect these entities. The most common method of creating a social network is based on the paradigm of invitation. There are several methods for invitation. The system can send invitations to those who are not members of the system yet. To be able to invite, the inviter must already have the invitee's contact information available. The most common source of such contact information is an address book. Moreover, a member of the social network can search for and find the user identifier of an already registered invitee with whom she wants to become friends with. The user sends an invitation message to the invitee to initialize the process of becoming friends. After the invitation has been sent, the inviter waits for the invitee in an asynchronous manner to confirm the invitation by replying to the message in a positive manner. This process of "friending" has to be carried out for each invitee in order to build a network. One drawback of the method is that the asynchronous nature of the invitation/response process slows down the creation of individual connections. Furthermore, repeating the manual process of creating a connection makes the method cumbersome to use.

BRIEF SUMMARY OF THE INVENTION

An object of the present invention is to facilitate user interaction in a network by exchanging presence information with each other.

Another object is to simplify the process of creating connections in a social network.

Another object is a method of identifying users based on their phone number and their address book.

One aspect of the present invention allows a user to send presence information to authorized contacts in her device's address book and to receive the presence information of those contacts in her device's address book that have authorized her. At its most basic, presence information is an indication of the availability of the user for phone calls and/or text messages. Optionally, presence can include additional information such as a short message, a picture, a video, the time zone or local time where the device is located, the weather conditions where the phone is located, ambient information such as noise or light level, calendar entries present on the device, and/or the physical location of the device.

A basic hardware system includes wireless phone services that provides access to the Internet for each phone. Internet service providers provide Internet access for computers.

The system is implemented in a client-server (CS) architecture or a peer-to-peer (PP) architecture. The main element of the system is a local application running on the phone. Users register their devices to enable the local application and are referred to as clients. The system consists of one or more central servers that are responsible for handling registration of clients and storing system membership information and the history of each client. In the CS architecture, the central server as also responsible for handling the client connections and distributing the presence information. In the PP architecture, clients exchange presence with each other directly. A client can be any device that has an address book and display, and is capable of operatively connecting to the central server.

A link, a logical connection between two clients, is created when a first client authorizes a second client to access her presence. The system permits a user to authorize any contact in her address book. If the user is in the contact's address book and the contact is a client, access is granted immediately. Otherwise access is granted if and when the user is added to the contact's address book and the contact becomes a client. Optionally, a user can only authorize a contact and be authorized by a contact if she is in that contact's address book.

In another aspect of the present invention, the method of authorizing and being authorized is applied to the friending process of social networks where a member of the social network can unilaterally friend any contact in her address book. If the friending member is in the contact's address book and the contact is a member, the contact is immediately given access to the friending member. Otherwise, once the friending member is added to the contact's address book and the contact becomes a member, the friended contact is notified of being friended and is given access to the friending member. Optionally, friending is only allowed between members that are in each others' address books.

Upon registering with the social network, the system automatically friends a predetermined subset of the contacts in her address book. Then the member can unfriend on a per contact or per group basis. Alternatively, upon registration, the member decides whom to friend prior to the system friending any contacts.

In the social networking context, upon registration, an application is enabled that interacts with the member's address book to retrieve contacts that the member wishes to friend. The application can run locally on the device or on a server on the Internet that can access the device via the device's Internet connection.

In the presence context, a local application interacts with the contacts in the phone's address book and presents them on the phone's display, manages the authorization of contacts, updates and announces the client's presence, and receives and displays the presence of contacts.

A graphical user interface of the local application displays an enhanced version of the phone's address book that includes a visual indicator of a contact's presence. Optionally, the enhanced address book display includes any other presence information associated with each contact.

The local application lets a user authorize or deauthorize a contact and any change of status is communicated to the affected contact, either through the central server in the CS architecture or directly to the contact in the PP architecture.

The local application can update the client's presence manually and/or, optionally, semi-automatically and/or automatically. A user can set her presence information manually via the GUI. Semi-automatic updates involve synchronizing the local application with the phone's internal calendar, external calendars, or web-based calendars. It can also include updating presence based on the phone's ring profile. Automatic updates involve the use of location data, the phone's built-in sensors (the microphone, motion-based sensors, and light sensors), accessories or networks connected to the phone (i.e., a car Bluetooth system or the office wireless network), and augmented reality.

In another aspect of the present invention the phone number and the address book of the device identify users. In modern communication a phone has a phone number assigned to. Although phone numbers are usually assigned to a specific person for a long period of time, a person can decide to change the phone number at any point in time. Therefore, phone numbers do not explicitly identify people. Address books on the other hand are specific to people due to the fact that even if the social network of two people is the same, it is highly unlikely that they have the same exact contact information for each of their contacts. The manner in which people use phone numbers and address books provides a unique way of telling people apart based on their phone numbers and the data they store in their address books. Such mapping of phone number/address book pairs identifies a person and more than one such pair can identify the same person.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application is a continuation application of U.S. application Ser. No. 13/626,817, hereby incorporated by reference in its entirety.

One aspect of the present invention is a system that allows a user to send presence information to contacts in her device's address book to whom she has granted permission—authorized—to receive her presence information—an authorized contact—and to receive the presence information of those contacts in her device's address book that have granted her permission to receive the presence information—an authorizing contact. Presence information can include several different parameters. The most basic form of presence is an indication as to whether or not the user is able to receive phone calls and/or wants to receive phone calls. Optionally, presence is an indication as to whether or not the user is able to receive text messages and/or wants to receive text messages. Optionally, such indications can also have a more detailed form in which the user specifies with a short message the reason for being or not being able to receive phone calls and/or text messages.

Optionally, presence can include a short message that describes the user's current situation and that can further include a picture or a video that describes the user's current status.

Optionally, presence can be combined with the physical location of the device with an arbitrary geographical resolution ranging from the building the user is currently in, through the city the user is in, through the country or continent the user is in. Similarly, presence can include the time zone that the device is in. The physical location of the device can be determined in several ways, as described below.

Figure 1:
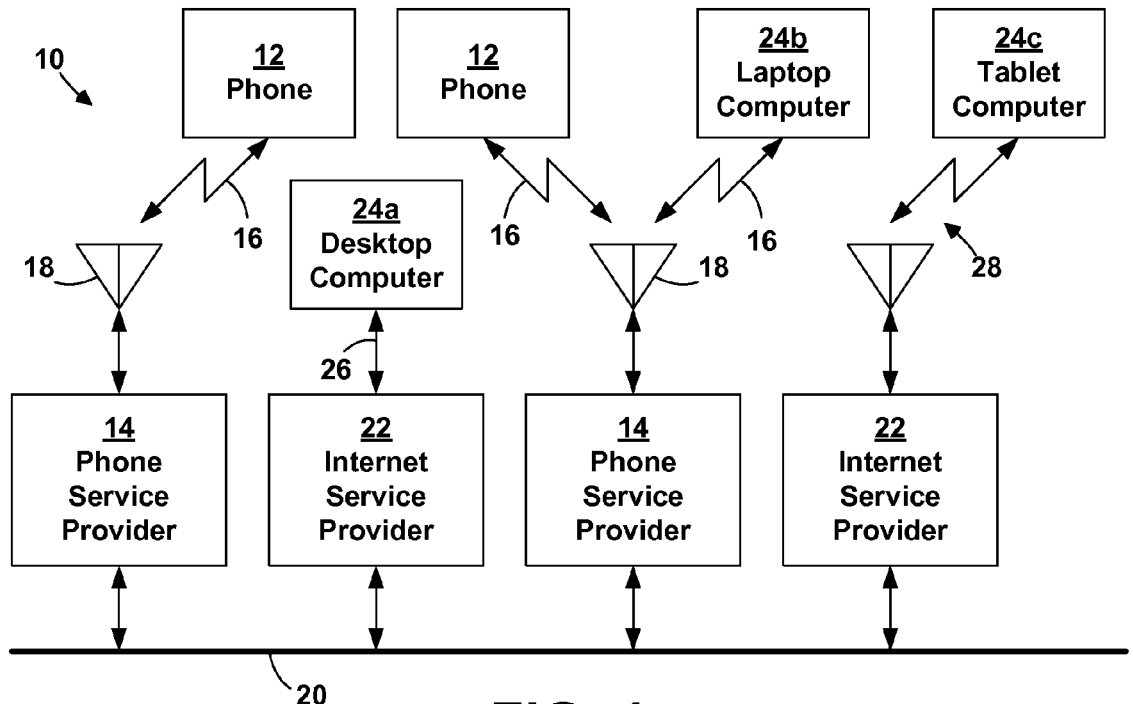
FIG. 1 is a hardware diagram of a basic cellular telephone and computer network system on which the present invention operates.

A basic hardware system 10 on which the present invention operates is shown in FIG. 1. The service for each cell phone 12 is provided by a wireless phone service provider 14, which provides a wireless telephone network and access to a global computer network 20, the Internet, as at 16. It does so via a network of antennas 18 and its associated infrastructure. Internet service providers 22 provide access to the Internet 20 for desktop computers 24*a*, laptop computers 24*b*, and tablet computers 24*c*. The connections can be hard-wired 26 or through a wireless network (Wi-Fi) connection 28. Computers 24 may also access the Internet 20 through a wireless phone service provider 14, like laptop computer 24*b*.

An Internet Protocol address (IP address) is a label assigned to each device (e.g., computer, printer, phone, etc.) participating in a computer network that uses the Internet Protocol for communication. An Internet Protocol Version 4 (IPv4) address consists of 32 bits, which provides a limited address space for unique addresses. Because of the limited number of addresses available using IPv4 and the proliferation of devices that connect to the Internet, IPv6, with a 128-bit address size, has been developed. An IP address is assigned to a device either at the time of a device restart or permanently by a fixed configuration in the hardware or software of a device.

IP addresses are assigned to a device either permanently or temporarily. When an IP address is assigned permanently, the device has a static IP address that will always identify the same device. Temporarily assigned IP addresses—dynamic IP addresses—can change periodically. Dynamic IP addresses help to ease the limitation of IPv4 address space. The main idea is that not all devices are connected to the Internet continuously. As a device disconnects, the dynamic IP address is released and assigned to the next device that connects to the network. The IPv6 address space makes it possible to assign static IP addresses for each device and these assigned IP addresses do not need to be released it even if it is not connected to the network. IPv6 unlocks a range of opportunities for network operations of mobile devices.

Every physical network interface has a unique Media Access Control address (MAC address). MAC addresses are usually assigned by the device manufacturer and are generally stored in hardware, read-only memory, or other firmware mechanism. The MAC address is permanent and identifies a particular network interface.

A Globally Unique Identifier (GUID) is a unique reference number used as an identifier. It is usually a 128-bit value.

Every device has unique serial number that is assigned by the manufacturer. Devices from different manufacturers may have the same serial number, but can be differentiated by the manufacturer.

The system can be structured using a client-server (CS) architecture or a peer-to-peer (PP) architecture. With either architecture, the main element of the system of the present invention is an application running on the device, referred to as the local application. The local application can be an element of the device's operating system, pre-installed, or downloadable by the user. Devices running the local application act as clients or peers in the system, depending on the system architecture, and are referred to hereinafter as clients. Entries in a client's address book that are also clients are referred to hereinafter as contacts.

Figure 2:
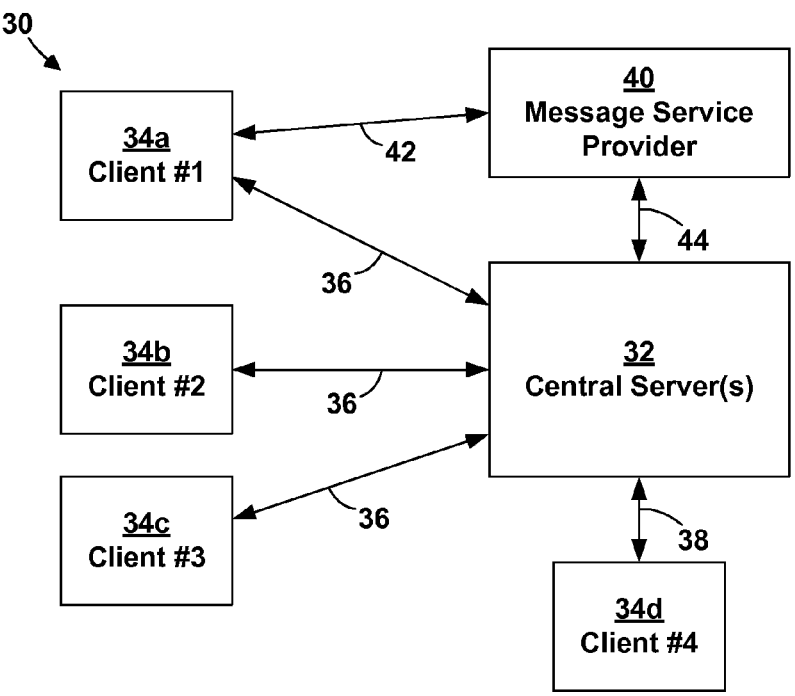
FIG. 2 is a logical diagram of the architecture of the system of the present invention.

A basic logical system 30 of the present invention is shown in FIG. 2. The system 30 consists of one or more central servers 32. The central server 32 is responsible for handling registration of clients 34*a*, 34*b*, 34*c*, 34*d* (collectively, 34). It also stores system membership information and the history of each client. History information can include when the client was last seen and changed her status. In the CS architecture, the central server 32 as also responsible for handling the connections for clients 34 and distributing the actual presence information among clients 34. In the PP architecture, clients 34 are able to exchange presence with each other without the assistance of the central server 32.

The present invention contemplates that a client 34 can be any device that has a display and either an address book or access to an address book, and is capable of operatively connecting to the central server 32. The address book can be either local, that is, resident on the device, or can be remote, that is, resident on a server accessible via the Internet. An example of a local address book is Microsoft Outlook and an example of a remote address book is Google Contacts. Each phone client 34*a*, 34*b*, 34*c* is operatively connected to the central server 32 through its phone service provider and the Internet, as at 36. A computer client (desktop, laptop, tablet, etc.) 34*d* can be operatively connected to the central server 32 through the Internet, as at 38. Clients 34 may also be operatively connected to third party message service providers 40 through its phone service provider and the Internet, as at 42, and the third party message service providers 40 are operatively connected to the central server 32 through the Internet, as at 44. The phone service providers and message service providers 40 are responsible for validating clients' phone numbers during the registration process, as described below. Once the registration process is complete, clients 34 in the CS architecture send their own presence information to the central server 32 and/or retrieve presence information of authorizing contacts from the central server 32. In the PP architecture, clients 34 send their own presence information to authorized contacts and/or retrieve presence information of authorizing contacts.

The system of the present invention identifies a client by its phone number, IP address, domain name, MAC address, GUID, serial number, or a combination of these. The value selected from this list to uniquely identify the device is hereinafter referred to as the client identifier. Any values used as a client identifier must remain fixed, that is, they cannot change. All of the above-listed values, with the exception of dynamic IP addresses, can be fixed. In order for the IP address to be usable as a client identifier, the IP address must always be known. There are at least two ways to accomplish this. In the first, a device is assigned a static IP address, either an IPv4 address or an IPv6 address. The static IP address does not change, and so is always known.

In the second, each device is assigned a unique domain name rather than a static IP address. A domain name maps to an IP address through the Domain Name System (DNS), a group of servers that maintains a data base of domain name-to-IP address mapping. When the device is assigned a dynamic IP address, the DNS is updated to reflect the new IP address. In order to access a device, the DNS is queried with the domain name, returning the current IP address.

Optionally, for security reasons, the system uses and stores a one-way cryptographic hash of each client identifier instead of the client identifier itself so that client identifiers are not stored in an easily readable form.

The system can create a map of all of the links between clients, where a link is a logical connection between two clients that allows access by one client to the presence of the other client. Whether a link is actually created between two clients depends on whether or not the first client wishes to share her presence with the second client. For example, if a client Alice authorizes a client contact Bob in her address book to access her presence information, the system creates and stores a unidirectional link between the client identifiers of Alice and Bob. In order to make the link bidirectional, Bob must have Alice in his address book and authorize her to access his presence information. The map of linked clients represents a network that describes the connections between clients. By providing presence to others, clients can interact with each other in a social networking way.

The map of linked clients is stored as a data base in the central server or distributed among the clients, depending on the system architecture, as described above. The structure of the data base is not an aspect of the present invention and any type of structure that is adequate to the task can be used.

As described above, a link is only created if a user authorizes a contact. In one configuration, the user initially authorizes all or a defined group of contacts in her address book and links are created to those contacts. The user can then revoke authorization on a per contact or per group basis after the links are created. If the authorization for a contact is revoked, the system removes that particular link from the map and the contact in no longer authorized. For example, if Alice's address book includes Bob and Carl, those two links will initially be created. If Alice subsequently revokes authorization for Bob, the link to Bob will be removed while the link to Carl will remain.

In another configuration, the user decides whom to authorize prior to the initial links being created. For example, if Alice's address book includes Bob and Carl but only Carl is authorized, only a link to Carl will be created. If Alice subsequently authorizes Bob, a link to Bob will then be created.

The system permits a user to authorize any contact in her address book. If the user is in the contact's address book and the contact is a client, access is granted immediately. If the contact is not a client or the user is not in the contact's address book, the authorized contact may not know of the authorization. Once the user is added to the contact's address book and the contact becomes a client, the contact is notified of the authorization status. For example, if client Bob is in client Alice's address book but Alice is not in Bob's address book, Alice can authorize Bob, but Bob will not be able to access Alice's presence. Once Bob enters Alice into his address book, he can access Alice's presence. Both Alice and Bob can give and withdraw authorization for contacts in their own address book to access their presence respectively. With this approach, the system provides users with full control over whom they share their presence with at any point in time.

Optionally, the system utilizes a security model that allows authorization only between clients that are verified to know each other. A user can only authorize a contact and be authorized by a contact if she is in that contact's address book. If Alice is in Bob's address book, then Alice can authorize Bob to access her presence information. However, Alice cannot access Bob's presence unless Bob also authorizes Alice. Both Alice and Bob can give and withdraw authorization for other contacts to access their presence. With this approach, the system provides users with full control over whom they share their presence with at any point in time.

In another aspect of the present invention, the method of authorizing and being authorized is applied more generally to the friending process of social networks. As described above, the friending process, as it is currently implemented, requires an invitation from a member inviter to an invitee and a positive reply from the invitee to the inviter. If the invitee is not a member of the social network, he must join in order to be friended.

In the present invention, the friending process is unilateral. A member of the social network merely informs the social network's central server which contacts in her address book she wishes to friend. There is no requirement that the contact agree to the friending or even acknowledge it. However, another embodiment of the present invention is capable of working in a bilateral manner, just like how regular social networking websites operate. In this embodiment, the acceptance and acknowledgement process of a friend request sets up a bilateral link. This requires both parties to be present in each other's address books. Alternatively, if only the friender has the contact information of the friendee, a message can be sent within the application to the friendee with the contact details of the friender, and a choice can be given to accept or decline the bilateral relationship.

Friending a contact gives that contact access to the member's social network. What that access entails depends in the design and purpose of the social network itself. It can mean that members can store personal information and share it with other members. It can mean the friended contact can access the member's personal information made public by the member. It can mean that the friended contact can communicate via a dedicated system. It can mean that the friended contact has access to current updates of the member, such as the presence information as described above.

The system can create a map of all of the links between members of a social network. Whether a link is actually created between two members depends on whether or the first member wishes to friend the second member and allows the second member access to the first member through the social network. For example, if member Alice friends member contact Bob in her address book, the system creates and stores a unidirectional link between the client identifiers of Alice and Bob and Bob has access to Alice through the social network. In order to make the link bidirectional, Bob must have Alice in his address book and friend her. The map of linked members describes the connections between the members of a social network.

The system permits a member to friend any contact in her address book. If the friending member is in the contact's address book and the contact is a member, the contact is immediately given access to the friending member via the social network. If the contact is not a member or the friending member is not in the contact's address book, the friended contact may not know that he has been friended, but the action of friending the contact is saved in a data base. When a user registers as a member, the data base is searched to determine if that new member has been friended by any other members. If so and if the friending member is in or added to the contact's address book, the friended contact is notified of being friended and is given access to the friending member via the social network. For example, if member Bob is in member Alice's address book but Alice is not in Bob's address book, Alice can friend Bob, but Bob will not know it and will not have access to Alice via the social network. Once Bob enters Alice into his address book, he is notified that he has been friended by Alice and has access to Alice via the social network. In another example, if members Alice and Bob are in each others' address book and Alice is a member but Bob is not, Alice can friend Bob, but Bob will not know it and will not have access to Alice via the social network. Once Bob becomes a member and it is determined from the data base that he has been friended by Alice, he is notified of the friending and is given access to Alice via the social network.

Both Alice and Bob can friend and unfriend other contacts to permit access through the social network. With this approach, the system provides members with full control over whom they give access to through the social network at any point in time.

Optionally, the system utilizes a security model that allows friending only between members that are verified to know each other. A member can only friend a contact and be friended by a contact if the member is in the contact's address book. For example, Alice can only friend Bob if Bob is in Alice's address book, Alice is in Bob's address book, and both are members.

Upon registering with the social network, as described below, in one configuration, the system automatically friends a predetermined subset of the contacts in her address book and links are created to those contacts. The term, subset, is intended to include all, less than all, or a specific group of contacts in the address book. A field of flag in the contact entry can denote the subset of those that the user wants to initially friend. The member can then unfriend on a per-contact or per-group basis after the links are created. If a contact is unfriended, the system removes that particular link from the map. For example, if Alice's address book includes Bob and Carl, those two links will initially be created upon Alice registering with the social network. If Alice subsequently unfriends Bob, the link to Bob will be removed while the link to Carl will remain.

In another configuration, upon registering with the social network, the member decides whom to friend prior to any links being created. For example, if Alice's address book includes Bob and Carl but Alice only wishes to friend Carl, only a link to Carl will initially be created. If Alice subsequently friends Bob, a link to Bob will then be created.

Preferably, in the presence context, a user registers with the system to become a client. There are currently a number methods of registration contemplated, however, any method that is adequate for the present invention can be used.

Figure 3:
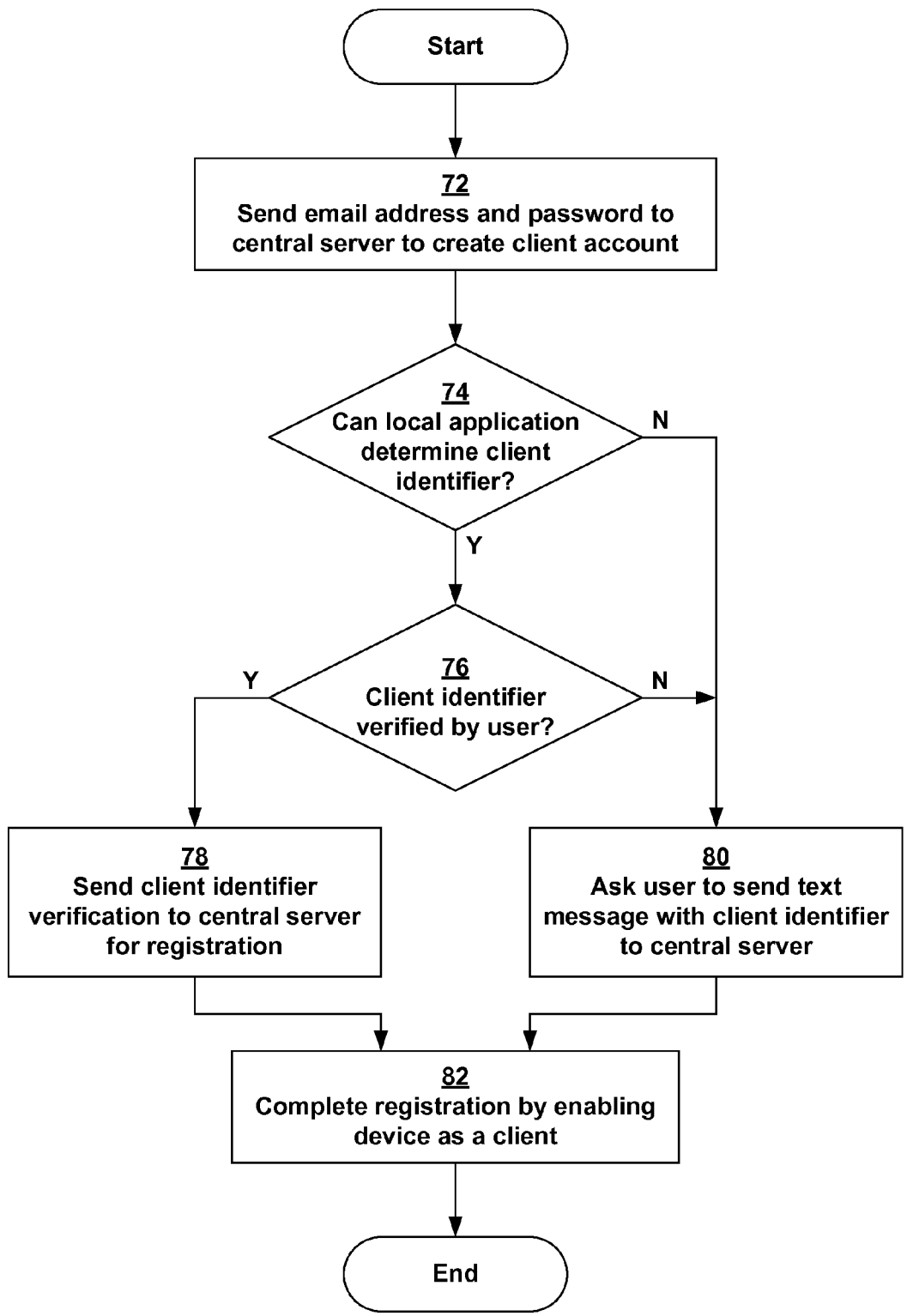
FIG. 3 is a flow diagram of the registration function of the local application.

In one method of registration, the user either runs or downloads and runs the local application. Through the local application, the user registers her email address with an encrypted password to create a client account, as at 72 in FIG. 3. If the local application is capable of determining the device's client identifier, as at 74, it will ask the user to verify the identifier, as at 76. If the user verifies the identifier, the local application sends it to the central server, as at 78. If the local application is not capable of determining the device's client identifier or the user does not verify the client identifier, the local application asks the user to send a text message to the central server with the client identifier, as at 80. Once the central server receives the client identifier, registration is completed by enabling the device as a client, as at 82.

In another method of registration, the user can register using a Web interface, such as a Web browser. The user creates the client account with an email address and an encrypted password. The user can then register client identifiers.

In another method of registration, the local application can present the user a unique identification number and initiate a phone call to an automated call center that asks the user to enter the unique identification number via the keypad of the device.

In another method of registration, the system identifies a user by a pair of data items. The pair consists of the device's client identifier and a unique hash value calculated from the contacts data stored in the device's address book. Even though the client identifier associated with a specific device and/or the contact data stored in an address book can change, the possibility of two people having the same client identifier and the same address book is vanishingly small. This condition makes it possible to unambiguously identify people based on the combination of their client identifiers and their address books. Upon registering with the system, the user registers her client identifier and a hash value that has been calculated from the contacts data stored in her address book. The local application stores a copy of the address book and calculates the hash value that resembles the current state of the address book, as described below. This hash value is stored on the server with the client identifier and is updated by the local application every time there is a change to the data stored in the address book. The local application periodically compares the data in the address book and the data of the copy of the address book to determine a percentage value by which the two differ. A difference greater than a preset threshold in percentage (e.g., more than 50%) is an indication that the client identifier no longer belongs to the client, but has been assigned to someone else. In such case, the system denotes that the client associated with that client identifier as invalid. When the now-invalid client indicates that her client identifier has changed, the system updates the invalid client with the new client identifier and denotes it as valid again.

As mentioned above, data stored in the address book can be used to calculate a hash value that serves as a form of identification for the owner of the address book. The address book hash value is calculated by concatenating the descriptive hash values of each contact stored in the address book and calculating a cryptographic hash of the resulting string. The hash value for a contact is calculated as follows: (1) Normalize all of the phone numbers of the contact, as described below, and sum the digits of all the normalized phone numbers. (2) Sum the integer values representing the UTF-8 characters of the first name of the contact. (3) Sum the integer values representing the UTF-8 characters of the last name of the contact. (4) Sum the integer values representing the UTF-8 characters of the email address(es) of the contact. (5) Sum the integer values representing the UTF-8 characters of the organization (s) of the contact. (6) Finally, sum the integers calculated in the previous steps (1) through (5) and assign the resulting integer to the contact as a descriptive hash value. The input data used to calculate the sums in steps (1) through (6) can be empty, in which case the corresponding sum is zero. If all the sums calculated in steps (1) through (6) are zero, the contact is considered to be empty and the hash value of such a contact is also zero.

To be able to calculate hash values for the contacts and to be able to match people based on their phone numbers stored in each other's address books, phone numbers have to be normalized to an international standardized format. Phone numbers are normalized with the following algorithm. (1) Determine the international country code of the device based on the devices home carrier network information. (2) Remove any spaces, dashes, brackets or extension numbers, including the character used to designate the beginning of the extension, from the phone number. (3) If the length of the phone number after step (2) is not between 4 and 15 digits, the phone number is considered to be an invalid international number. (4) If the phone number begins with +, 00, or 001, drop the prefix and go to step (8). (5) If the phone number begins with the international country code determined in step (1) and the rest of the phone number has enough digits for what is typical in that country, go to step (8). (6) If the phone number does not begin with the international country code determined in step (1) but has enough digits for what is typical in that country, prefix the phone number with the country code determined in step (1) and go to step (8). (7) Check if the phone number is of not enough length that is typical for that given country. In this case the phone number is considered internationally invalid. (8) Resolve any letters of the English alphabet found in the phone number to the appropriate number.

The aspect of monitoring changes in address books also enables the system to determine correlations between the degrees of changes in the address books. These correlations can trigger recommendations for the users' friends.

Upon registration, the client identifier acts as a unique username that can be replaced with a specific character combination, such as the client identifier encrypted, to increase the security of the system. Also, any client identifier can be mapped onto a new global unique identifier or a new local unique identifier. The global unique identifier identifies the user uniquely in the system. For example, an IPv6 address can be mapped onto a phone number or vice-versa. In the case of a local identifier, the user can map the client identifier onto a new identifier that is unique only in his address book and not in the system.

In the social networking context, a user registers with a central server to become a member of the social network. The manner of registration and the information needed to register depend on the needs of the particular social network. The registering user needs to provide one or more unique identifiers required by the system, such as a phone number, domain name, email address and/or address book hash value, so the member can be uniquely identified within the social network. The unique identifier supplied during registration is the member ID. Optionally, the registering user provides a different and unique value as a member ID that the central server ties to the unique identifier(s). The unique identifier(s) is necessary because the present invention uses the member's address book to create links to contacts in the address book and it is presumed that each contact has at least some form of unique identifier(s). When the contact registers with the central server as a new member of the social network, the central server looks at the data base to see if that new member's unique identifier(s) has already been friended by any older members. If so, the appropriate links are created and the new member is notified.

Registering with the social network system enables access to the device by the central server via a local or remote application. A local application runs locally on the device whereas a remote application runs on a server, such as the central server, that can access the device via the device's connection to the Internet. At a minimum, the application interacts with the member's address book to retrieve the unique identifier for a contact that the member wishes to friend.

Figure 4:
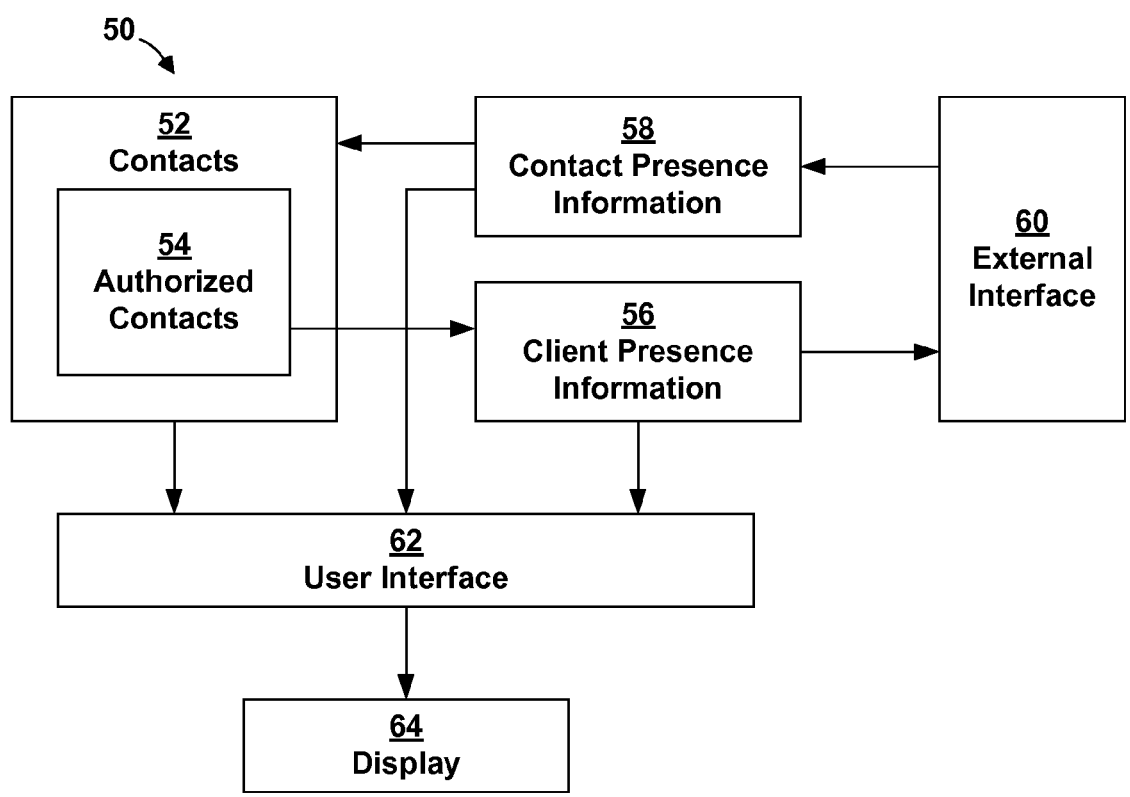
FIG. 4 is a block diagram of how the local application interacts with the phone.

The local application 50 for the presence context, a diagram of which is shown in FIG. 4, provides the following functions for the client: (1) interacting with the contacts 52 in the device's address book and presenting them on the device's display 64; (2) managing the authorization of contacts to access the client's presence 54; (3) updating and announcing the client's presence manually and/or, optionally, semi-automatically and/or automatically 56 via the device's external interface 60; and (4) receiving and displaying the presence of contacts 58 via the external interface 60. If the client identifier is a domain name, the local application 50 may also be tasked with updating the DNS with the current IP address if it changes.

The graphical user interface (GUI) 62 of the local application displays an enhanced version of the phone's address book. At a minimum, the enhancement consists of a visual indicator of a contact's presence. Such an indication can be by an icon or a color. The user can check the status of each contact, available or not available, by looking at the visual indicator associated with the contact. If the contact is available, it means that the contact is able to and is willing to receive phone calls and/or text messages. If the contact is unavailable, it means that the contact will most likely not answer a call and/or response to the text message. Optionally, a third status of unknown indicates that the system has no currently presence information for the contact.

If a contact has not authorized the client to access his presence, the present invention contemplates that the indicator may show the contact as unavailable, that there may be no indicator at all, or that there may be a special indicator. Optionally, the enhanced address book display includes any other desired presence information associated with a given contact, such as text (e.g., the status message), audio (e.g., a sound effect or audio message), video (e.g., status video), or location data.

A contact menu option or softkey enables the user to authorize or deauthorize a contact. When a contact is authorized or deauthorized, that change in status is communicated to the affected contact via the device's external interface. In the CS architecture, the local application notifies the central server of the status change, which then notifies the affected contact. In the PP architecture, the client notifies the affected contact of the status change directly.

Whenever any presence information is changed either manually, semi-automatically, or automatically, the present invention contemplates several possibilities for distributing that change to its authorized contacts. In the CS architecture, the local application sends the client's presence to the central server via the external interface. Once the presence information in the central server is updated, how the authorized clients receive the updated presence depends on whether the present invention uses a push model or a pull model. In the push model, the central server forwards the updated presence information to each of the authorized contacts. In the pull model, each client periodically queries the central server for updates in the presence of any of its authorizing contacts. In the PP architecture using a push model, the local application sends the updated client's presence to each authorized contact. In the PP architecture using a pull model, a client periodically queries each of its authorizing contacts for changes in presence.

As described above, the local application can update the client's presence manually and/or, optionally, semi-automatically and/or automatically. A user can set her presence information manually via the GUI. After presence is set manually, the new setting is available. In the CS architecture, the new presence is sent to the central server. In the PP architecture, the new presence is either sent or available to authorized contacts depending on whether the system is employing a push or pull model.

Typically presence is associated with a single device, that it, when the local application updates the client's presence, it is meant to indicate the new presence of the user of the device that the local application is running on. The present invention contemplates that presence of a single device can be associated with other devices. For example, if the user has both a personal phone and a work phone, the two phones can be associated through their client identifiers so that if the presence of one is updated, the presence of the other is also updated. The association can be bidirectional, that is, a presence update to either device will also update the presence of the associated device. For example, one device can be set to update presence automatically and the other manually. The presence of both devices will be updated automatically through the device set to automatic, and if the presence of the manual device is updated manually, the presence of both will be updated. Since there is a potential for conflict, the device that the user wishes to have priority can be set.

For other than manual presence changes, the local application checks for a change of presence periodically at preset intervals. The interval is typically on the order of five minutes, but can be changed manually or dynamically adjusted based on the load on the system.

Changing presence semi-automatically involves synchronizing the local application with the device's internal calendar, external calendars, or web-based calendars. With this method, the start and end dates and times of scheduled meetings, appointments, and the like cause the local application to set presence. This method also supports the manual override of presence.

Optionally, updating presence semi-automatically can include changing presence based on the device's ringing profile. For example, if a user changes her ring profile to silent or vibrate only, the system can be set to automatically change her presence to unavailable.

Many devices can provide location data that local applications can use for location-based services. For example, a device may be equipped with a positioning system (e.g., GPS). Moreover, devices can usually communicate via several different wired and wireless technologies (e.g., cellular, Wi-Fi, Bluetooth, mobile Internet, and USB). A cellular phone can estimate its location using cellular network data. A Wi-Fi-capable device can determine its location using wireless signal data. In the event a device itself does not provide location data, active network signals can be used to determine the location of the device. The user might manually associate a wireless network or USB connection with a specific location (e.g., home, office, etc.) or activity (e.g., driving). Some devices combine these technologies to provide enhanced location data. Alternatively, the user might manually enter her specific location.

The local application can utilize different built-in sensors of the device to change presence automatically in conjunction with location data. The device's microphone, motion-based sensors, light sensors, and other sensors can be utilized in combination to trigger a change of presence automatically, as described below. Also, the identifier of an active wireless network hot-spot or a Bluetooth system can trigger a presence change automatically. This method also supports manual override of presence.

The system can store previously collected or learned patterns of common activities involving motion, frequency of alternating motion changes, changes in light conditions, the frequency of changes in light conditions, changes in ambient sound, the frequency of changes in ambient sound, and any combination. The system can use generic patterns and/or can learn user-specific patterns during a training period.

The system can do active pattern matching and tries to match the sampled data from sensor(s) collected over a period of time with the predefined patterns. Each predefined pattern is associated with a specific status in the system. If the system is able to match the sampled sensor data with one of the predefined patterns, it automatically sets the presence information to the specific one associated with the predefined pattern.

The microphone of a device can be used to sample the ambient noise. The sample can be compared to and matched with common noises such as traffic while walking, a car while sitting inside, public places such as malls, an office, walking with the phone in the pocket, and a household, such as a television turned on. Users' presence can be automatically set based on a match of such sampling.

Motion-based data supplied by a device can also be sampled. The sample can be compared to and matched with specific human motions such as walking. The client's presence can be automatically set based on a match of such sampling. For example, a user can manually set her status to be offline while sitting in a meeting. After the meeting is over, the user usually walks away from the meeting venue, but she might forget to set her status back to online. By detecting a walking motion paired with a change in the ambient noise, the local application can automatically set the client's presence to online.

Light sensor data supplied by a device can be used to help set the client's presence automatically. Light sensor data can be matched with the time of day to deduce a client's presence. For example, a dark environment with the ambient noise of a movie can be interpreted as the user being in a movie theater and her presence can automatically be set to do not disturb.

These sampling techniques can also be used in conjunction with each other to further enhance the performance of the system.

The system can also leverage the properties of augmented reality. The location of a client's friends can be determined by extracting location information from the presence of the client's client contacts. The local application can display the live camera image of the device the local application is running on and indicate if a contact of the user is in the direction that falls in the angle of view of the camera by utilizing location data supplied by the device. As an example of usage of this feature, a user could point her device's camera running the local application into a meeting room while standing outside of the room behind closed doors and determine which colleagues are attending the meeting without actually interrupting the meeting by knocking on the door.

Thus it has been shown and described a system and method for providing presence information and connecting persons in a social network. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A system for distributing presence information among a plurality of devices operated by a corresponding user, the system comprising:
    (a) the plurality of devices operatively connected to each other through a global computer network;
    (b) each of the devices having an address book with at least one contact;
    (c) each of the devices having a display on which the address book can be viewed by the user;
    (d) each of the devices running a local application with access to the address book and the display, the local application including instructions for carrying out a method for distributing the presence information among a plurality of devices, the method comprising the steps of:
    (1) accepting a change in authorization for the contact from the user and identifying the contact that is authorized as an authorized contact, verifying that the device is in the contact's address book before authorizing the contact, the device having a link with the authorized contact through the global computer network;
    (2) updating the presence information of the device;
    (3) making the presence information available directly to the authorized contact through the link;
    (4) acquiring the presence information from the contact through the link if the device is an authorized contact of the contact; and
    (5) including the presence information from the contacts for which the device is an authorized contact when displaying the address book on the display.

2. The system of claim 1 wherein the presence information made available by pushing it to the authorized contact.

3. The system of claim 1 wherein the presence information is made available by sending it to the authorized contact in response to a query from the authorized contact.

4. The system of claim 1 wherein the method further comprises sending the change in authorization to the contact affected by the change directly through the link.

5. The system of claim 1 wherein the method further comprises sending the change in authorization to the contact affected by the change through a server.

6. The system of claim 1 wherein the presence information includes a location of the device.

7. The system of claim 1 wherein the presence information includes a message describing a situation of the user.

* * * * *